L. E. BACON.
SHOE FOR PNEUMATIC TIRES.
APPLICATION FILED JUNE 14, 1918.
1,281,893.
Patented Oct. 15, 1918.
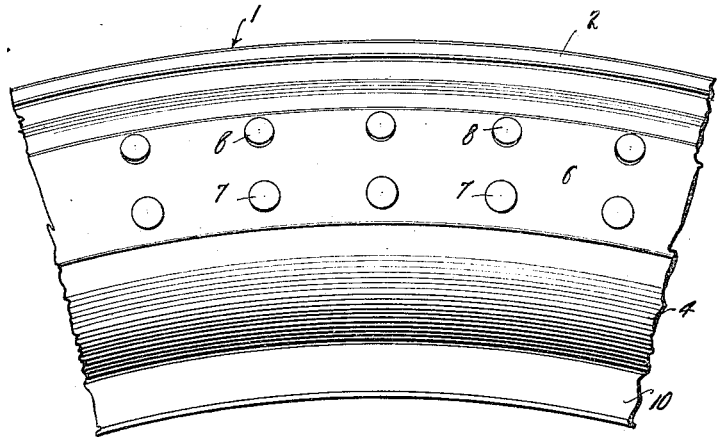
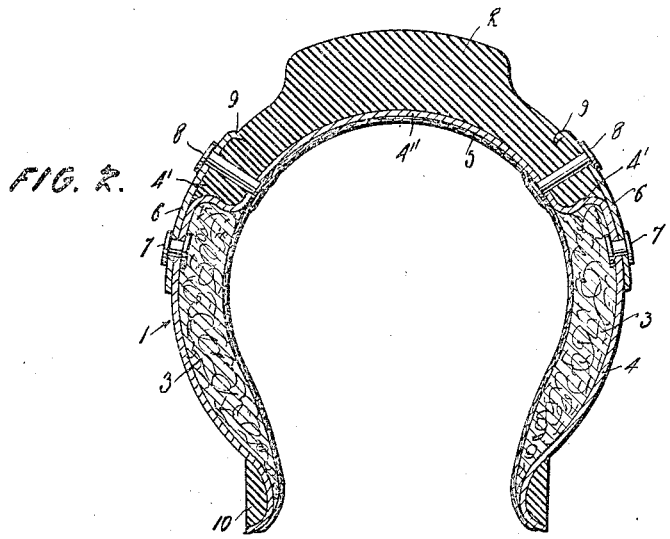
WITNESSES
W. C. Fielding
S. M. McGill
INVENTOR
Levi E. Bacon
BY Richard Owen.
ATTORNEY

UNITED STATES PATENT OFFICE.

LEVI E. BACON, OF ESTELENE, COLORADO.

SHOE FOR PNEUMATIC TIRES.

1,281,893.  Specification of Letters Patent.  Patented Oct. 15, 1918.

Application filed June 14, 1918. Serial No. 240,050.

*To all whom it may concern:*

Be it known that I, LEVI E. BACON, a citizen of the United States, residing at Estelene, in the county of Baca and State of Colorado, have invented certain new and useful Improvements in Shoes for Pneumatic Tires, of which the following is a specification.

This invention relates to vehicle tires, and more particularly to shoes or casings for pneumatic tires.

The object of the invention is to provide a casing of this character constructed to economize in rubber and yet maintain a resiliency requisite for tires of this character.

Another object is to construct a tire shoe to embody simplicity, economy in construction, and effectiveness in operation and which is practically puncture proof.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a portion of a tire shoe constructed in accordance with this invention, and Fig. 2 is a transverse section thereof.

In the embodiment illustrated, a shoe 1 is shown comprising a rubber tread member 2 extending substantially across the entire tread surface of the shoe with asbestos or other puncture-proof side walls 3 forming continuations of said tread. A sheet metal casing 4 preferably of sheet steel is arranged in the outer face of the asbestos side walls 3 and offset laterally inward at 4′ and positioned on the inner face of the tread member 2 whereby said tread and side walls will be completely protected against puncture and reinforced.

A canvas lining 5 is shown arranged on the inner faces of the asbestos side walls 3 and the portion 4″ of the metal casing which is arranged on the inner face of the tread 2.

Reinforcing plates 6 overlap the meeting edges of the tread and side walls on their outer faces and are riveted at 7 to the metal casing 4 outside the side walls and at 8 to the edges of the tread member 2, the rivets extending through the portion 4″ of the casing 4 as is shown clearly in Fig. 2. These plates 6 have inturned biting flanges 9 at their free edges which are embedded in the outer faces of the tread 2 to assist in holding the tread in operative position.

Rubber attaching flanges 10 are carried by this shoe to facilitate its connection with the wheel rim.

From the above description it will be obvious that a tire constructed as shown and described will be puncture proof, economical in construction, minimizing in the amount of rubber used and yet having sufficient resiliency to meet all the requirements of such a shoe.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

1. A tire shoe comprising a rubber tread and asbestos side walls with a metal casing arranged outside said side walls and inside said tread.

2. A tire shoe comprising a rubber tread and asbestos side walls with a metal casing arranged outside said side walls and inside said tread, said casing being composed of a single sheet of metal having offset sides arranged to span the edges of the tread so as to position the central portion of said sheet inside the tread.

3. A tire shoe comprising a rubber tread and asbestos side walls with a metal casing arranged outside said side walls and inside said tread, said casing being composed of a single sheet of metal having offset sides arranged to span the edges of the tread so as to position the central portion of said sheet inside the tread, and plates arranged to overlap the outer faces of the tread and side walls at their meeting edges.

4. A tire shoe comprising a tread member and side walls with a metal casing arranged outside said side walls and inside said tread.

5. A tire shoe comprising a rubber tread having transversely curved side edges, asbestos side walls continuing from said side edges, a metal casing arranged outside said side walls and inside said tread with laterally and inwardly offset portions shaped to conform to the curvature of the edges of the tread, and means for fixedly connecting said tread and side walls.

6. A tire shoe comprising a rubber tread having transversely curved side edges, asbestos side walls continuing from said side edges, a metal casing arranged outside said side walls and inside said tread with laterally and inwardly offset portions shaped to conform to the curvature of the edges of the tread, reinforcing plates lapping the meeting edges of the tread and side walls on their outer faces and fixed to said side walls with securing elements passed through said plates, the edges of the tread and the casing inside said tread.

7. A tire shoe comprising a tread member and side walls with a metal casing arranged outside said side walls and inside said tread, said casing having offset portions disposed between the inner edges of the tread member and the adjacent edges of the side walls.

8. A tire shoe comprising a tread member and side walls with a metal casing arranged outside and closely hugging said side walls and inside said tread.

In testimony whereof I affix my signature in presence of two witnesses.

LEVI E. BACON.

Witnesses:
CHAS. I. COLLINS,
JNO. D. MCARTHUR.

Copies of this patent may be obtained for five cents each, by addressing the "Commissioner of Patents, Washington, D. C."